(12) United States Patent
Heiselbetz

(10) Patent No.: US 10,974,665 B2
(45) Date of Patent: Apr. 13, 2021

(54) SECURING DEVICE FOR A DECOUPLING DEVICE ON A SHIELDING PART, DECOUPLING DEVICE HAVING THE SECURING DEVICE, AND SHIELDING PART HAVING THE DECOUPLING DEVICE

(71) Applicant: ELRINGKLINGER AG, Dettingen-Erms (DE)

(72) Inventor: Gerald Heiselbetz, Langenzenn (DE)

(73) Assignee: ElringKlinger AG, Dettingen-Erms (DE)

( * ) Notice: Subject to any disclaimer, the term of this patent is extended or adjusted under 35 U.S.C. 154(b) by 0 days.

(21) Appl. No.: 16/091,773

(22) PCT Filed: Mar. 16, 2017

(86) PCT No.: PCT/EP2017/056276
§ 371 (c)(1),
(2) Date: Oct. 5, 2018

(87) PCT Pub. No.: WO2017/174324
PCT Pub. Date: Oct. 12, 2017

(65) Prior Publication Data
US 2019/0161028 A1    May 30, 2019

(30) Foreign Application Priority Data
Apr. 5, 2016 (DE) ..................... 10 2016 106 152.2

(51) Int. Cl.
*B60R 13/08* (2006.01)
*F01N 13/10* (2010.01)
(Continued)

(52) U.S. Cl.
CPC ........ *B60R 13/0876* (2013.01); *F01N 13/102* (2013.01); *F01N 13/14* (2013.01);
(Continued)

(58) Field of Classification Search
CPC .. F01N 2260/20; F01N 13/14; F01N 13/1855; F01N 13/1811; F01N 13/102;
(Continued)

(56) References Cited

U.S. PATENT DOCUMENTS 2,816,340 A * 12/1957 Anglada Domenech ....................
................................................................ A45C 13/123
24/604
3,019,008 A * 1/1962 Coyle ...................... F16F 15/06
267/182

(Continued)

FOREIGN PATENT DOCUMENTS

| DE | 602004002062 T2 | 1/2007 |
|---|---|---|
| DE | 202011001961 U1 | 1/2012 |
| EP | 2481640 A1 | 8/2012 |

*Primary Examiner* — Jonathan Liu
*Assistant Examiner* — Taylor L Morris

(57) ABSTRACT

A fastening device for fastening a decoupling device relative to a hole rim of a hole opening of a shielding part; to achieve the vibration-decoupling connection of a bushing to the shielding part, the decoupling device has at least one bridge element, which, at its radially outer edge, has fasteners for producing a fastening connection of the bridge element to the hole rim of the shielding part, wherein the fasteners comprise at least four tabs which, starting from the bridge element, protrude radially outward and a subset of at least two tabs of the bridge element is provided to rest against a first outside of the shielding part and a remainder of at least two tabs is provided to rest against an opposite second outside of the shielding part and the hole rim can be immobilized with a force fit relative to the decoupling device by means of the tabs of the subset and the tabs of the remainder.

8 Claims, 7 Drawing Sheets

(51) Int. Cl.
*F01N 13/14* (2010.01)
*F01N 13/18* (2010.01)
*F16B 5/02* (2006.01)

(52) U.S. Cl.
CPC ........ *F01N 13/1811* (2013.01); *F16B 5/0241* (2013.01); *B60R 2013/0807* (2013.01); *F01N 13/1855* (2013.01); *F01N 2260/20* (2013.01); *F01N 2450/24* (2013.01)

(58) Field of Classification Search
CPC ............. F01N 2450/24; F01N 13/1805; F01N 13/1822; F16F 15/06; F16F 7/00; B60R 13/0206; B60R 2013/0807; B60R 13/0876; B60R 13/08; F16B 39/24
See application file for complete search history.

(56) References Cited

U.S. PATENT DOCUMENTS

| | | | | |
|---|---|---|---|---|
| 3,027,609 A * | 4/1962 | Parkin | A47B 95/04 | 403/297 |
| 3,028,138 A * | 4/1962 | Wells | F16F 15/067 | 248/619 |
| 3,037,734 A * | 6/1962 | Coyle | F16F 1/02 | 267/134 |
| 3,065,941 A * | 11/1962 | Loftis | F16F 15/06 | 248/604 |
| 3,072,287 A * | 1/1963 | Sampson | F16J 13/14 | 220/309.2 |
| 3,379,090 A * | 4/1968 | Parkin | F16B 37/043 | 411/427 |
| 4,530,491 A * | 7/1985 | Bucksbee | F16F 1/3732 | 267/141 |
| 4,531,870 A * | 7/1985 | Moryl | F16B 37/042 | 24/453 |
| 4,606,688 A * | 8/1986 | Moran | B60Q 1/0433 | 411/175 |
| 4,863,329 A * | 9/1989 | Wilson | F16B 5/02 | 411/339 |
| 5,505,324 A * | 4/1996 | Danico | B62D 25/24 | 220/201 |
| 5,702,133 A * | 12/1997 | Pavur | B60R 13/0206 | 220/789 |
| 5,758,860 A * | 6/1998 | Hanazaki | B60K 11/04 | 180/68.4 |
| 5,950,277 A * | 9/1999 | Tallmadge | F16B 5/0258 | 16/2.1 |
| 5,971,346 A * | 10/1999 | Monneau | B60K 13/04 | 248/58 |
| 6,131,252 A * | 10/2000 | Hoheisel | B60K 13/04 | 24/514 |
| 6,302,617 B1 * | 10/2001 | Rumpp | B60D 1/52 | 285/401 |
| 6,561,312 B2 * | 5/2003 | Stanienda | F16B 5/0241 | 180/300 |
| 6,705,813 B2 * | 3/2004 | Schwab | F16B 21/20 | 411/156 |
| 6,758,646 B1 * | 7/2004 | Ishida | F16B 39/028 | 411/119 |
| 7,065,963 B2 * | 6/2006 | Niwa | B60R 13/0876 | 165/72 |
| 7,273,128 B2 * | 9/2007 | Niwa | B60R 13/0876 | 181/207 |
| 8,104,573 B2 * | 1/2012 | Oxenknecht | B60R 13/0876 | 181/200 |
| 8,979,456 B2 * | 3/2015 | Soriano | B60R 13/0206 | 16/2.1 |
| 9,120,509 B2 * | 9/2015 | Iwahara | B62D 25/24 | |
| 9,435,363 B2 * | 9/2016 | Stewart | F16B 5/0258 | |
| 9,587,664 B2 * | 3/2017 | Bisset | F16B 5/0266 | |
| 9,610,880 B2 * | 4/2017 | Masanek, Jr. | B60N 3/044 | |
| 9,694,761 B2 * | 7/2017 | Krus | B60R 13/0876 | |
| 9,744,922 B2 * | 8/2017 | Ostermeier | F01N 13/1855 | |
| 9,964,175 B2 * | 5/2018 | Herald | B21D 5/00 | |
| 2002/0071765 A1 | 6/2002 | Sahay et al. | | |
| 2004/0081537 A1 * | 4/2004 | Nishikawa | B62D 25/2072 | 411/437 |
| 2004/0244156 A1 * | 12/2004 | Jackson, Jr. | B60R 13/0206 | 24/295 |
| 2005/0140075 A1 * | 6/2005 | Mishima | F02B 77/13 | 267/140.11 |
| 2010/0047011 A1 * | 2/2010 | Eberle | B60R 13/0206 | 403/280 |
| 2010/0213649 A1 * | 8/2010 | Lee | F16F 15/06 | 267/93 |
| 2010/0290862 A1 * | 11/2010 | Balsa Gonz Lez | F16B 5/0275 | 411/214 |
| 2012/0171413 A1 * | 7/2012 | Fisk | B32B 15/01 | 428/131 |
| 2013/0034377 A1 | 2/2013 | Friedow et al. | | |
| 2013/0241122 A1 * | 9/2013 | Akimoto | F01N 13/10 | 267/136 |
| 2014/0319830 A1 * | 10/2014 | Weidner | F01N 13/1805 | 285/368 |
| 2015/0086290 A1 * | 3/2015 | Bisset | F16B 39/26 | 411/15 |
| 2015/0337713 A1 * | 11/2015 | Callahan | F01N 13/08 | 181/228 |
| 2018/0023657 A1 * | 1/2018 | Kato | F16F 15/067 | 403/42 |
| 2018/0361952 A1 * | 12/2018 | Petley | B60R 13/0876 | |
| 2019/0093697 A1 * | 3/2019 | Becker | F16B 5/0258 | |
| 2019/0234448 A1 * | 8/2019 | Owens, II | B60R 13/08 | |

* cited by examiner

SECURING DEVICE FOR A DECOUPLING DEVICE ON A SHIELDING PART, DECOUPLING DEVICE HAVING THE SECURING DEVICE, AND SHIELDING PART HAVING THE DECOUPLING DEVICE

FIELD OF THE INVENTION

The invention relates to a fastening device for fastening a decoupling device relative to a hole rim of a hole opening of a shielding part. The invention also relates to a decoupling device having the fastening device and to a shielding part.

BACKGROUND OF THE INVENTION

A fastening device having the features of the preamble to claim 1 is known from DE 60 2004 002 062 T2. In its radially outer region, a bridge element for connecting a bushing to a shielding part has a fastener for connecting the outer edge of the bridge element to a hole rim of the shielding part. Such a fastener is disclosed as a ring with an s-shaped cross-section, which at one end, embraces the edge of the bridge element and at the other, embraces the hole rim with a folded-over collar. The proposed fastening device requires an undesirably large amount of installation work because the fastener must first be attached to the decoupling device and then the combined decoupling device and fastener must be attached to the shielding part. In addition, a large number of material folds occur in the region of the hole rim, which can promote unwanted corrosion, particularly during operation of the shielding part.

Based on the above-mentioned prior art, the object of the invention is to disclose a fastening device for fastening a decoupling device relative to a hole rim of a hole opening of a shielding part, which is easy and inexpensive to produce and requires a small amount of installation work.

SUMMARY OF THE INVENTION

A fastening device according to the invention for fastening a decoupling device relative to a hole rim of a hole opening of a shielding part, in which in order to achieve the vibration-decoupling connection of a bushing to the shielding part, the decoupling device has at least one bridge element, which, at its radially outer edge, has fasteners for producing a fastening connection of the outer edge of the bridge element to the hole rim of the shielding part, is modified according to the invention in that the fasteners comprise at least four tabs, which, starting from the outer edge of the bridge element, protrude radially outward beyond the outer edge, and a subset of at least two tabs of the bridge element is provided to rest against a first outside of the shielding part and a remainder of at least two tabs is provided to rest against an opposite second outside of the shielding part and the hole rim can be immobilized with a force fit between the tabs of the first subset and the tabs of the remainder.

With the invention, it is particularly advantageous that a bridge element, which on the one hand is used for a vibration-decoupling function between the shielding part and the bushing, is also used on the other hand to form fasteners.

In this regard, a functional combination is achieved, which leads to the fact that the fastening device requires fewer components as compared to the prior art. Moreover, it is possible to eliminate installation steps of an additional connecting device for attachment to the bridge element.

In a preferred embodiment, the fastening device is modified in such a way that the bridge element is embodied of one piece, in particular of one piece and one layer comprised of a single sheet metal layer, and constitutes both the tabs of the subset and the tabs of the remainder, which are offset from one another in a circumference direction U and are connected to the bridge element so that they are of one piece with it.

This makes it possible, in a particularly simple way, to fasten the outer edge of a one-layer bridge element to the hole rim of the shielding part in an immobilized fashion.

In another embodiment of the invention, the bridge element is embodied of multiple pieces, particularly of multiple layers comprising at least one first individual part and at least one second individual part, with the first individual part forming the tabs of the subset and the second individual part forming the tabs of the remainder.

In a for example two-piece bridge element, the two individual parts of the bridge element are advantageously involved in both the vibration-decoupling connection of the bushing to the shielding part and also the attachment of the outer edge of the decoupling device to the hole rim. By means of this, it is possible, for example, to achieve a uniform loading of the individual parts of the bridge element during operation.

In another preferred embodiment, viewed in the circumference direction U, adjacent tabs of the first individual part and viewed in the circumference direction U, adjacent tabs of the second individual part each form at least two spaces, with the tabs of the second individual part reaching radially and/or axially through the at least two spaces between tabs of the first individual part and with the tabs of the first individual part reaching radially and/or axially through the at least two spaces between the tabs of the second individual part and with the points where the tabs reach through the spaces being situated radially inside the hole rim of the shielding part.

With such an embodiment of the fastening device and an installation of such a decoupling device having this embodiment of the fastening device on a shielding part, the tabs of the individual parts—because of the reach-through points being situated inside the hole rim of the shielding part and an attachment of the tabs to the shielding part being situated outside the reach-through point—constitute an additional fixing of the individual parts relative to each other in an axial direction. In the vicinity of the reach-through point, the individual parts are supported against each other and thus constitute a short path for a flow of force. Furthermore, the reaching-through ensures that with a transmission of axial forces that are to be transmitted between the decoupling device and the shielding part, the two individual parts of the bridge element are always involved in the transmission of axial force.

In another preferred embodiment of the fastening device, in a preinstallation position of the decoupling device, the tabs of the subset or the tabs of the remainder are bent radially inward so that the decoupling device can be inserted into the hole opening in the shielding part in such a way that the other tabs extending radially outward can be brought into contact with the associated outside of the shielding part. Such an embodiment makes it possible for the decoupling device having the fastening device according to the invention to be embodied so that it can be preassembled in module-like fashion and in a preassembled state, for it to be inserted as a unit into the associated opening in the shielding part and in the inserted state, to fasten it merely by bending the tabs, which were initially bent radially inward, outward onto the shielding part. Another preferred embodiment of the fastening device is characterized in that the tabs of the subset and the tabs of the remainder are arranged one after the other in alternating fashion viewed in the circumference direction U. Such an embodiment of the fastening device ensures a particularly uniform force introduction of holding forces into the hole rim of the shielding part or conversely from the hole rim of the shielding part into the decoupling device. Another advantageous embodiment of the fastening device features the fact that in the installed state, cut edges of a space bottom of the spaces of the one individual part are supported resting against the tabs of the other part. This makes it possible, in the vicinity of the point where the tabs reach through the spaces of the other tabs, to ensure a support of the individual parts relative to one another and thus to implement the short flow-of-force path already mentioned above.

It has turned out to be advantageous to embody the one-piece bridge element or the individual parts of a multi-piece bridge element as stamped-and-bent or deep-drawn stamped parts composed of a metal sheet. A thickness of 0.1 mm through 0.5 mm has proven to be an advantageous material thickness for the metal sheet.

The embodiment of the one-piece bridge element or the embodiment of the individual parts of a multi-piece bridge element out of a spring steel has proven its worth as the preferred choice for a metal material.

BRIEF DESCRIPTION OF THE DRAWINGS

The invention will be explained in greater detail below by way of example based on the drawings. In the drawings.

DETAILED DESCRIPTION OF THE PREFERRED EMBODIMENTS

Figure 1:
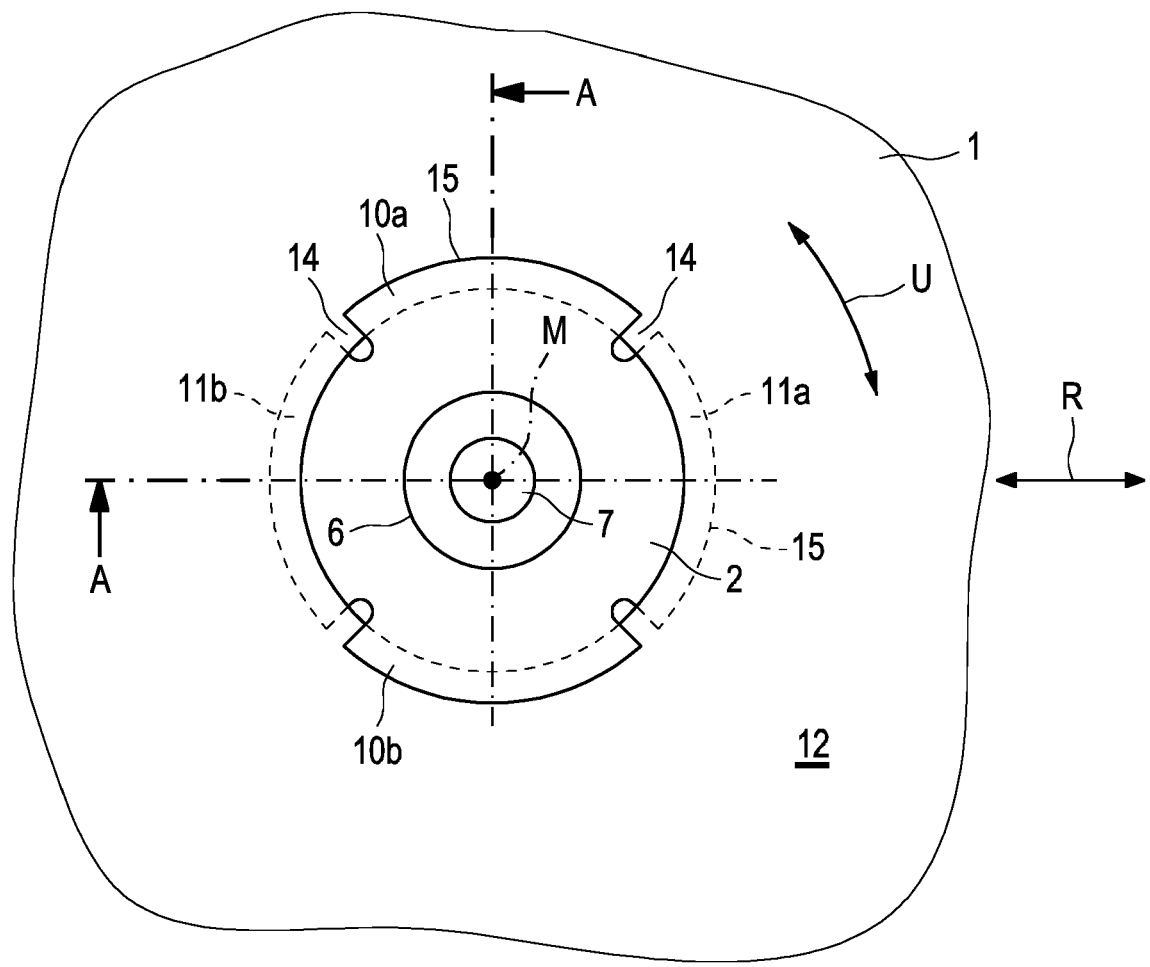
FIG. 1: shows a top view of a subsection of a shielding part with a decoupling device that is fastened in a hole opening by means of the fastening device according to the invention in a first embodiment.

A first embodiment of the invention will be explained in greater detail below by way of example based on FIGS. 1 through 3.

A shielding part 1 is usually embodied as a broad one-layer or multi-layer sheet metal layer, e.g. composed of aluminum or steel, in particular stainless steel. Such a shielding part is usually used as a heat shield; for example, such a heat shield is used in automotive engineering in the vicinity of hot components, e.g. exhaust manifolds, catalytic converters, turbochargers, or the like. One object of such a heat shield is to keep radiated heat away from components that are more sensitive to heat exposure in the vicinity of the hot component.

During operation, in addition to a heat exposure, shielding parts 1 of this kind are usually also subject to a vibration impingement and for the fastening of the shielding part 1, have at least one, but preferably several decoupling devices 2 on a fastening counterpart 3. The fastening counterpart 3 can be the above-mentioned hot components, for example turbochargers or the like. The shielding parts 1 can also be fastened to body parts or other cooler components, which are not heat-emitting.

In addition to the fastening function, the at least one decoupling device 2 essentially has the tasks of decoupling mechanical vibrations of the shielding part 1 from the fastening counterpart 3 and, in the vicinity of a fastening point, providing a sliding seat between the shielding part 1 and the fastening counterpart 3 in order to be able to compensate for thermal expansions of the shielding part 1. The decoupling devices 2 are positioned in a hole opening 4 of the shielding part 1 and the hole opening 4 has a surrounding hole rim 5. The hole rim 5 in this case must be understood to be a region adjoining the radial outside of the cut hole edge 5a of the hole opening 4.

The decoupling device 2 has a bushing 6, which has a through opening 7 through which a fastener, e.g. a screw (not shown) can be inserted; with the fastener, the bushing 6 can be fastened to the fastening counterpart 3. The bushing 6 is coupled to a bridge element 8. By means of the fastening device according to the invention, the bridge element 8 is affixed to the shielding part 1 in the region of the hole rim 5.

The bushing 6, in particular the through opening 7, has a center axis M. A direction parallel to the center axis M is defined as an axial direction A. A direction orthogonal to the center axis M is defined as a radial direction R. In this context, an orientation of the radial direction R away from the center axis M is defined as "radially outward." An orientation in the radial direction R toward the center axis M or positioned closer to the latter is referred to below as "radially inward" or "radially further inward." A circumference direction U is defined as a direction concentric to the center axis M; a circumference direction U has no fixed radial distance from the center axis M.

The fastening device according to the invention fixes the bridge element 8 in a form-fitting way in the axial direction A relative to the hole rim 5 of the shielding part 1. The fastening device according to the invention—as described further below—immobilizes the bridge element 8 relative to the shielding part 1 in both the radial direction R and the circumference direction U, preferably in a frictional, non-positive way, with the frictional, nonpositive engagement being achieved by means of a force fit of the bridge element 8 on the shielding part 1. The force fit and thus the frictional, nonpositive engagement is embodied in such a way that the bridge element 8 is immobilized relative to the shielding part 1 for axial forces, radial forces, or moments around the center axis M that occur during operation of the shielding part 1. In this respect, statements below with regard to an immobilizing of the bridge element 8 relative to the shielding part 1 should be understood to mean that the decoupling element 2 is supported in stationary fashion relative to the shielding part 1 with regard to forces that occur in the axial direction A or radial direction R or moments around the center axis M that are to be expected when the shielding part 1 is used as intended. In an advantageous fashion for producing a sliding seat relative to the bridge element 8 in the radial direction R, the bushing 6 is supported in the bridge element 8 with play so as to enable a movement of the bridge element 8 in the radial direction R relative to the bushing 6. In the axial direction A, the bushing 6 is advantageously supported without play relative to the bridge element 8. The bridge element 8 is embodied as elastically resilient with regard to axial forces between the bushing 6 and the shielding part 1 and therefore performs an elastic decoupling function.

The fastening device according to the invention holds the decoupling device 2 so that it does not move relative to the shielding part 1 when the shielding part 1 is used as intended. Possibly occurring movements of the bushing 6 relative to the shielding part 1 in the circumference direction U and/or in the radial direction R are compensated for by the fact that the bushing 6 is supported so that it is able to rotate in the circumference direction U relative to the bridge element 8, possibly by overcoming frictional forces, and so that it is able to move in the radial direction R relative to the bridge element 8, possibly by overcoming frictional forces. This achieves the decoupling of the bushing 6 relative to the shielding part 1. As described above, the bushing 6 is decoupled relative to the shielding part 1 in the axial direction A by means of an elastically resilient embodiment of the bridge element 8.

In order to embody the fastening device according to the invention, the radially outer part of the bridge element 8 has at least four tabs 10a, 10b; 11a, 11b functioning as fasteners. A first subset of at least two tabs 10a, 10b of the bridge element 8 is provided to rest against a first outside 12 of the shielding part 1, particularly in the region of the hole rim 5 preferably in the immediate radially outer vicinity around the cut hole edge 5a. A remainder of at least two tabs 11a, 11b is provided to rest against a second outside 13 of the shielding part 1 opposite from the first outside 12. In a properly and completely assembled state, the tabs 10a, 10b of the subset rest against the first outside 12 of the shielding part 1 in the region of the hole rim 5. Also in the properly and completely assembled state, the tabs 11a, 11b of the remainder rest against the second outside 13 of the shielding part 1 in the region of the hole rim 5. While doing so, the tabs 10a, 10b of the subset and the tabs 11a, 11b of the remainder form a force fit for the hole rim 5 of the shielding part 1; viewed in the circumference direction U, one of the tabs 10a, 10b of the subset is followed by one of the tabs 11a, 11b of the remainder and one of the tabs 11a, 11b of the remainder is once again followed by one of the tabs 10a, 10b of the subset.

Figure 2:
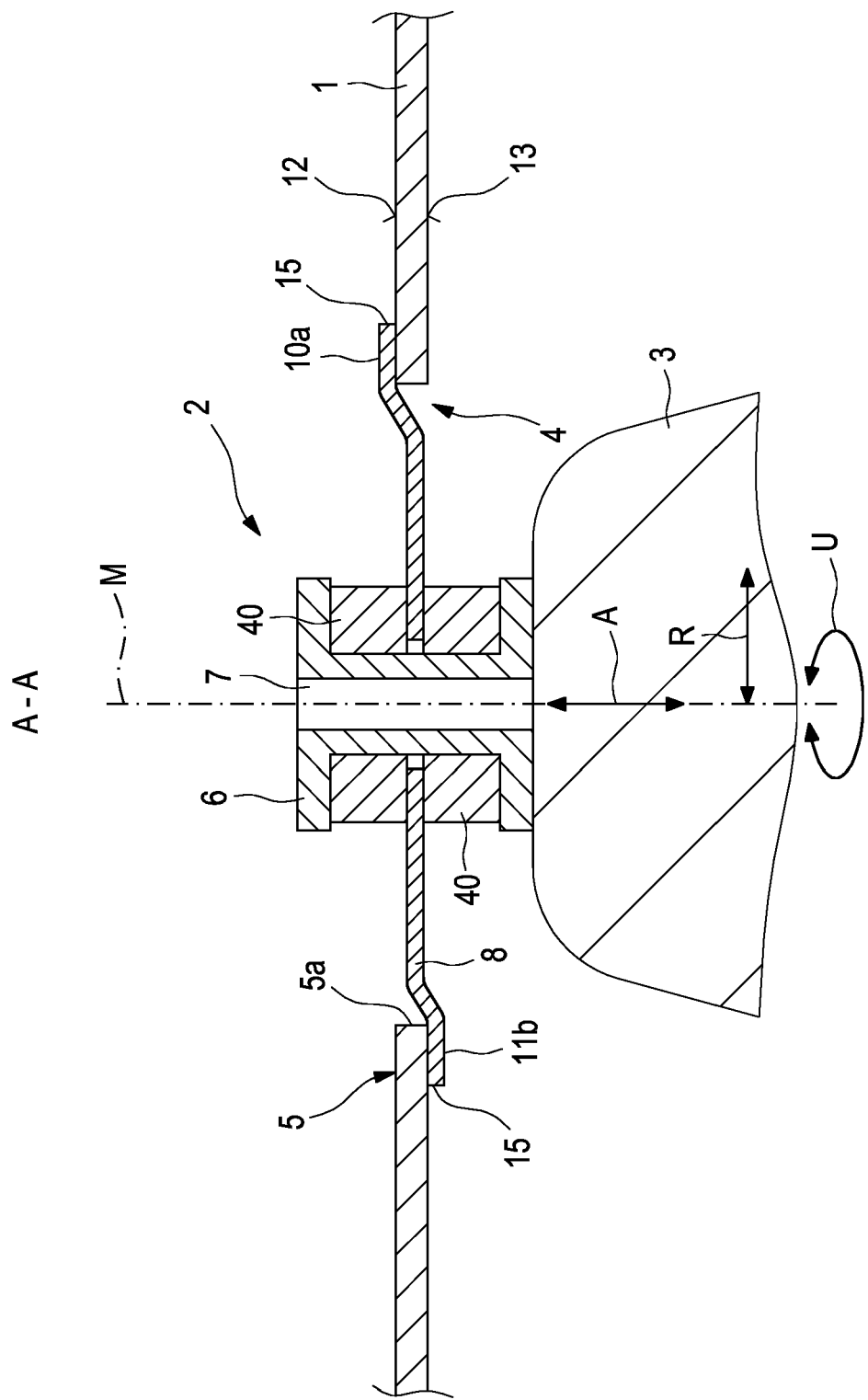
FIG. 2: schematically depicts a section along the line A-A in FIG. 1.
Figure 3:
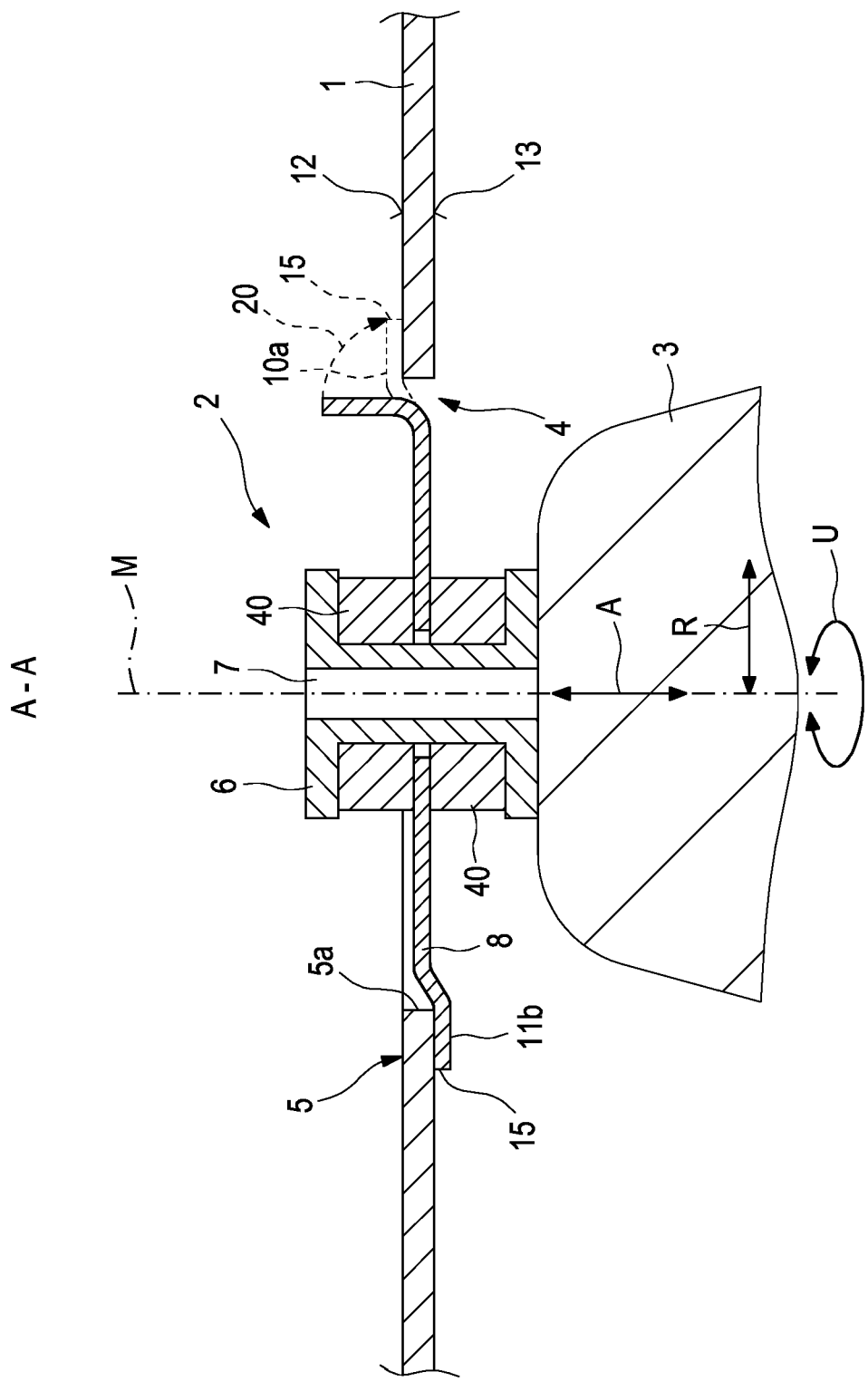
FIG. 3: shows the section according to the FIG. 2 in which the fastening device according to the invention is in a preinstallation position.

The tabs 10a, 10b of the subset and the tabs 11a, 11b of the remainder are connected to the bridge element 8 so that they are of one piece with it and in the exemplary embodiment according to FIGS. 1 through 3, are arranged so that they alternate with one another (viewed in the circumference direction U).

Between two adjacent tabs 10a, 11b; 11b, 10b; 10b, 11a and 11a, 10a, there are cut-outs 14. The cut-outs 14 make it possible for the tabs 10a, 10b of the subset to be positioned offset in the direction toward the first outside 12 and for the tabs 11a, 11b to be positioned offset in the direction toward the second outside 13 relative to the bridge element 8. The cut-outs 14 extend in the radial direction R from a radially outer edge 15 of the bridge element 8 radially inward into a region situated radially inside the cut hole edge 5a of the hole opening 4.

The above-described embodiment of the fastening device according to the invention demonstrates one possibility for embodying the fastening device out of a one-piece and in particular one-layer bridge element 8, which has a three-dimensional form essentially the shape of a washer, for example. This is a particularly simple possibility for implementing the fastening device according to the invention for fastening a decoupling device 2 to a hole rim 5 of a shielding part 1. Such a one-piece, in particular one-layer bridge element 8 can be simply embodied as a stamped-and-bent part or deep-drawn stamped part composed of a metal sheet. Preferred material thicknesses have turned out to be sheet thicknesses of 0.1 mm to 0.5 mm. For example, a stainless steel with the material number 1.4301 has turned out to be an advantageous material for embodying such a one-piece bridge element 8. This material features a high workability with low return and/or spring-back tendency. As described below, this is particularly advantageous for installing the decoupling device 2 and for connecting the bridge element 8 to the hole rim 5.

For purposes of installing a decoupling device 2 that has the fastening device according to the invention, in a preinstallation position of the decoupling device, either the tabs 10a, 10b of the subset or the tabs 11a, 11b of the remainder are positioned so they are bent radially inward (see FIG. 3). In this preinstallation position, the tabs 10a, 10b that are bent radially inward extend essentially in the axial direction A. In the preinstallation position shown in FIG. 3, the decoupling element 2 can be inserted into the hole opening 4 in an installation direction V from the second outside 13 of the shielding part 1. In this case, the tabs 10a, 10b of the subset reach through the hole opening 4. The decoupling device 2 is guided into the hole opening 4 along the installation direction V until the tabs 11a, 11b of the remainder that protrude radially outward rest against the second outside 13. To produce the proper fastening of the decoupling device 2 relative to the shielding part 1, after the insertion of the preassembled decoupling device 2, the tabs 10a, 10b of the subset that are bent radially inward are folded radially outward along an arrow direction 20 and brought into a clamping contact with the first outside 12 of the shielding part. To ensure a sufficiently firm force fit between the hole rim 5 and the tabs 10a, 10b and 11a, 11b, the tabs 10a, 10b and 11a, 11b are pressed against the shielding part 1 in the region of the hole rim 5 by means of a suitable pressing tool and with a sufficiently high pressing force. The intensity of the pressing in this connection must be chosen so that the force fit can reliably resist expected operating forces in the radial direction R and also expected moments around the center axis M, which can occur between the bridge element 8 and the shielding part 1 during operation.

A second embodiment of the fastening device according to the invention will be described below based on FIGS. 4 through 8 in the example of a second embodiment of a decoupling device 2. An essential difference of the embodiment according to FIGS. 4 through 8 as compared to the embodiment according to FIGS. 1 through 3 is that the decoupling device 2 has a multi-piece embodiment composed of a first individual part 30 and a second individual part 31. The first individual part 30 has the tabs 10a, 10b, which constitute the subset. The tabs 11 of the remainder are formed on the second individual part 31. In the exemplary embodiment according to FIGS. 4 through 8, the first and second individual parts 30, 31 each have eight tabs 10, 11.

In the example of the first exemplary embodiment, it was explained that at least two tabs 10 and at least two tabs 11 have to be present.

Naturally, there can be more than two—in the present example in particular, eight tabs 10 make up the subset and eight tabs 11 of the second individual part 31 make up the remainder. Between each pair of tabs 10 of the first individual part 30, there are spaces 33. The spaces 33 have open cut edges 35 in the region of the space bottom 34. Viewed in the circumference direction U, the spaces 33 have at least an inside diameter that is large enough for the tabs 11 of the second individual part 31, when—as described below—the two individual parts 30, 31 are placed against each other, to be able to reach through the spaces 33 axially and radially. Corresponding to the first individual part 30, between every two tabs 11 of the second individual part 31, there is a space 36, with open cut edges 38 at its space bottom 37. The spaces 36 of the second individual part 31 in this case are dimensioned in the circumference direction U so that tabs 10 of the first individual part 30 can reach through the spaces 36 in an axial direction and a radial direction R. Analogous to the bridge element 8 in the first embodiment, the individual parts 30, 31 have a through opening 100, which is suitable for accommodating a bushing 6 (shown in FIG. 5) with radial play and in an axially play-free manner. In such an installed state, cut edges 35 of spaces 33 of the first individual part 30 are placed against tabs 11 of the second individual part 31. Likewise, in an installed state of the decoupling device 2 according to FIG. 5, cut edges 38 of the spaces 36 of the second individual part 31 are placed against tabs 10 of the first individual part 30. In the above-described position, the individual parts 30, 31 are connected so that they are prestressed in the axial direction A by the bushing 6. FIG. 5 shows an external view of such a preassembled decoupling device 2. In this preinstallation position, the tabs 10 are positioned pointing radially outward. The tabs 11 of the remainder, which are formed by second individual part 31 in the exemplary embodiment according to FIGS. 4 through 8, are bent so that they are angled radially inward and, at least in their end region, extend in the axial direction A (see FIGS. 4 and 5). Such a preinstallation position is depicted with dashed lines in FIG. 8. Analogous to the exemplary embodiment according to FIGS. 1 through 3, in order to install the decoupling device 2 in the shielding part 1, the tabs 11 must be bent in the arrow direction 20 when the decoupling device 2 has been inserted into the hole opening 4 of the shielding part 1 in the installation direction V and the tabs 10 have been brought into contact with the second outside 13. Analogous to the embodiment according to FIGS. 1 through 3, in an embodiment according to FIGS. 2 through 8, the tabs 10 of the subset and those 11 of the remainder are also pressed against the shielding part 1 to produce a firm installation so that the shielding part 1, in particular its hole rim 5, is secured between the tabs 10, 11 with a force fit. The force fit in this case is chosen with regard to its intensity so that usual and expected forces that occur during operation can be transmitted to the shielding part 1 via the force fit.

Figure 4:
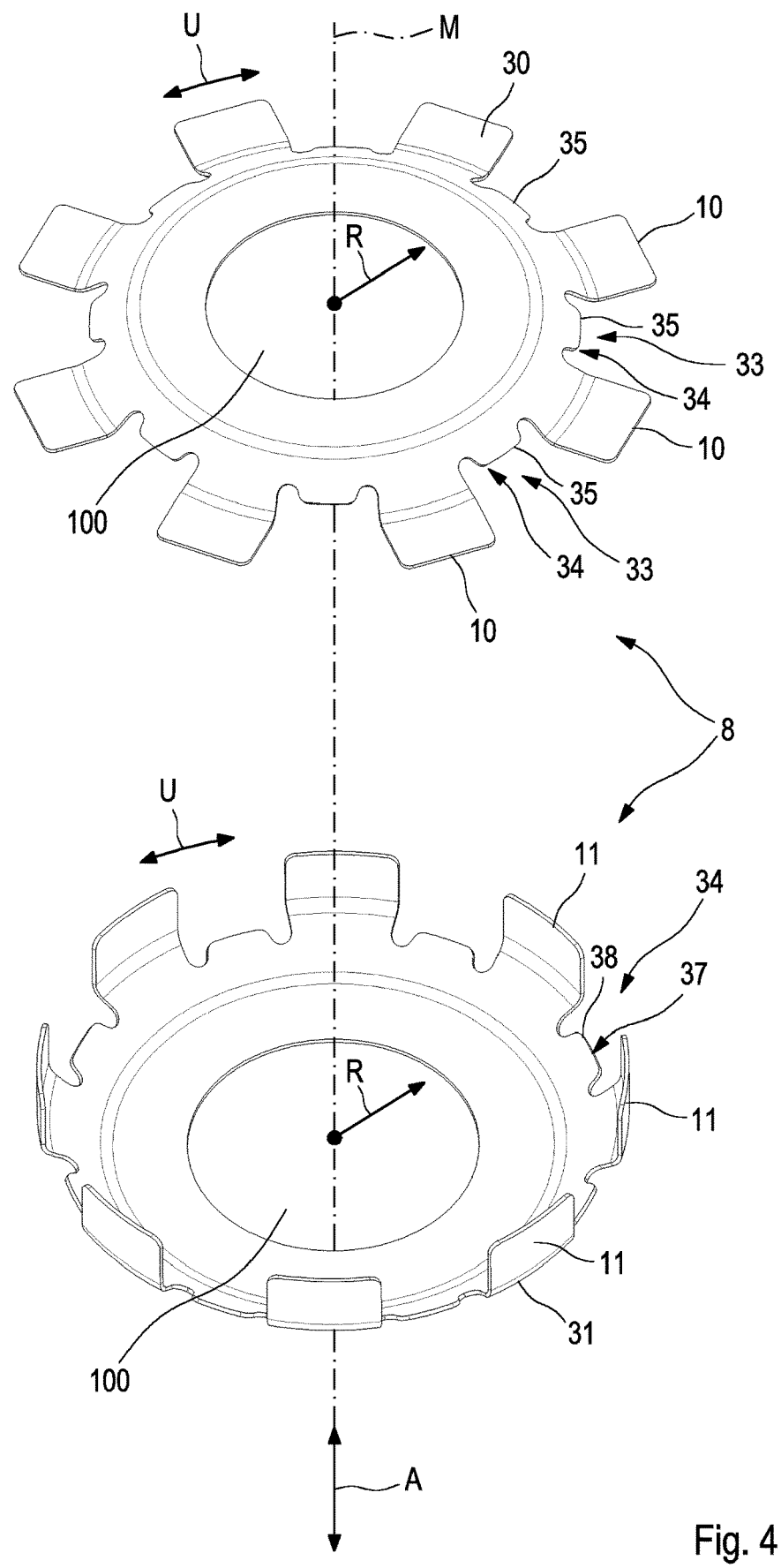
FIG. 4: shows a perspective exploded view of a second embodiment of the fastening device according to the invention in a multi-piece embodiment.
Figure 5:
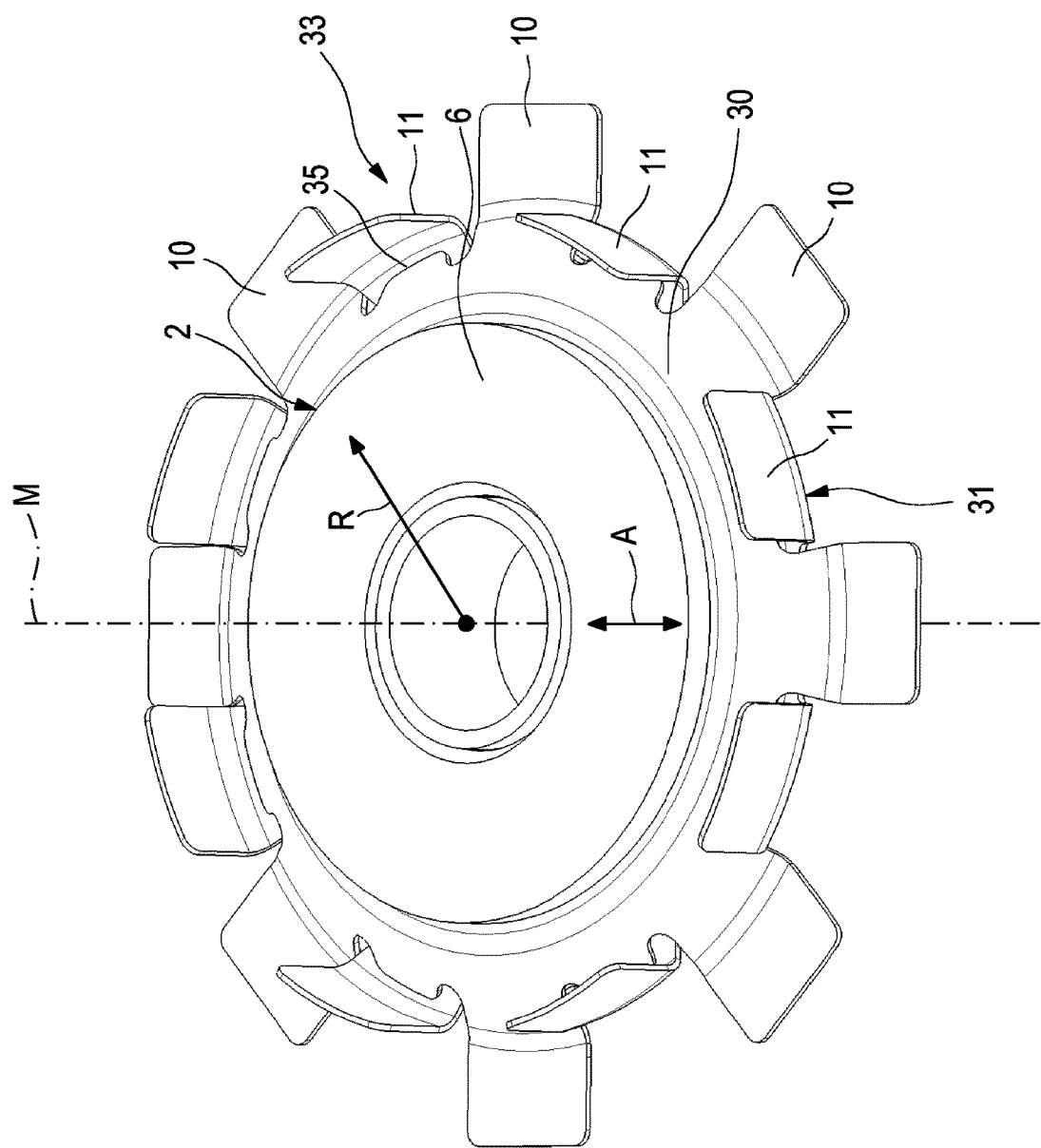
FIG. 5: shows the embodiment according to FIG. 4 in a perspective assembled depiction together with a bushing in a preinstallation position.
Figure 7:
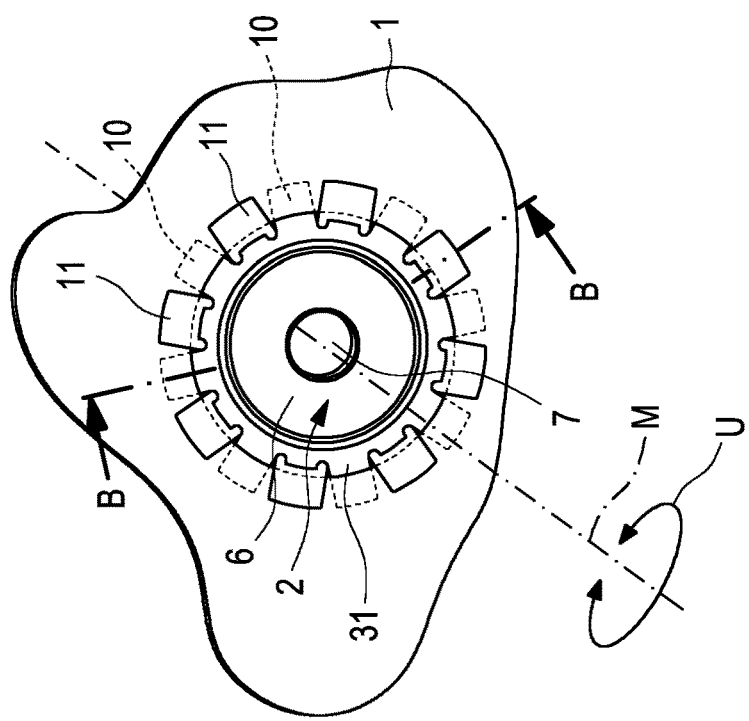
FIG. 7: shows a schematic perspective view of the second outside of the shielding part with an inserted decoupling device, which is fastened by means of the fastening device according to the invention in the second embodiment.
Figure 6:
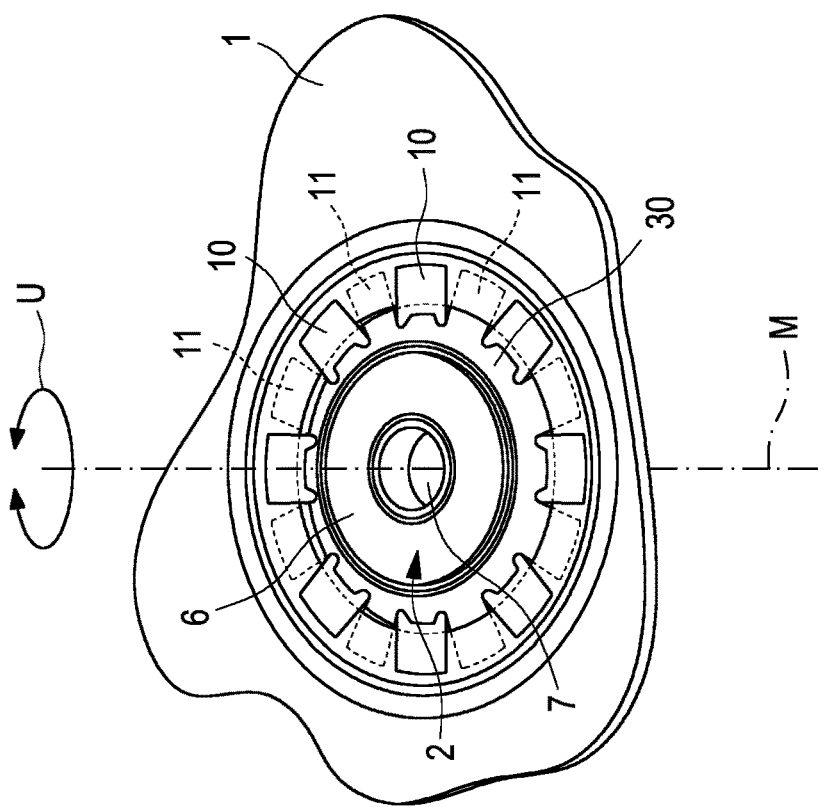
FIG. 6: shows a perspective view of a first outside of the shielding part with an inserted decoupling device, which is fastened by means of the fastening device according to the invention in the second embodiment.
Figure 8:
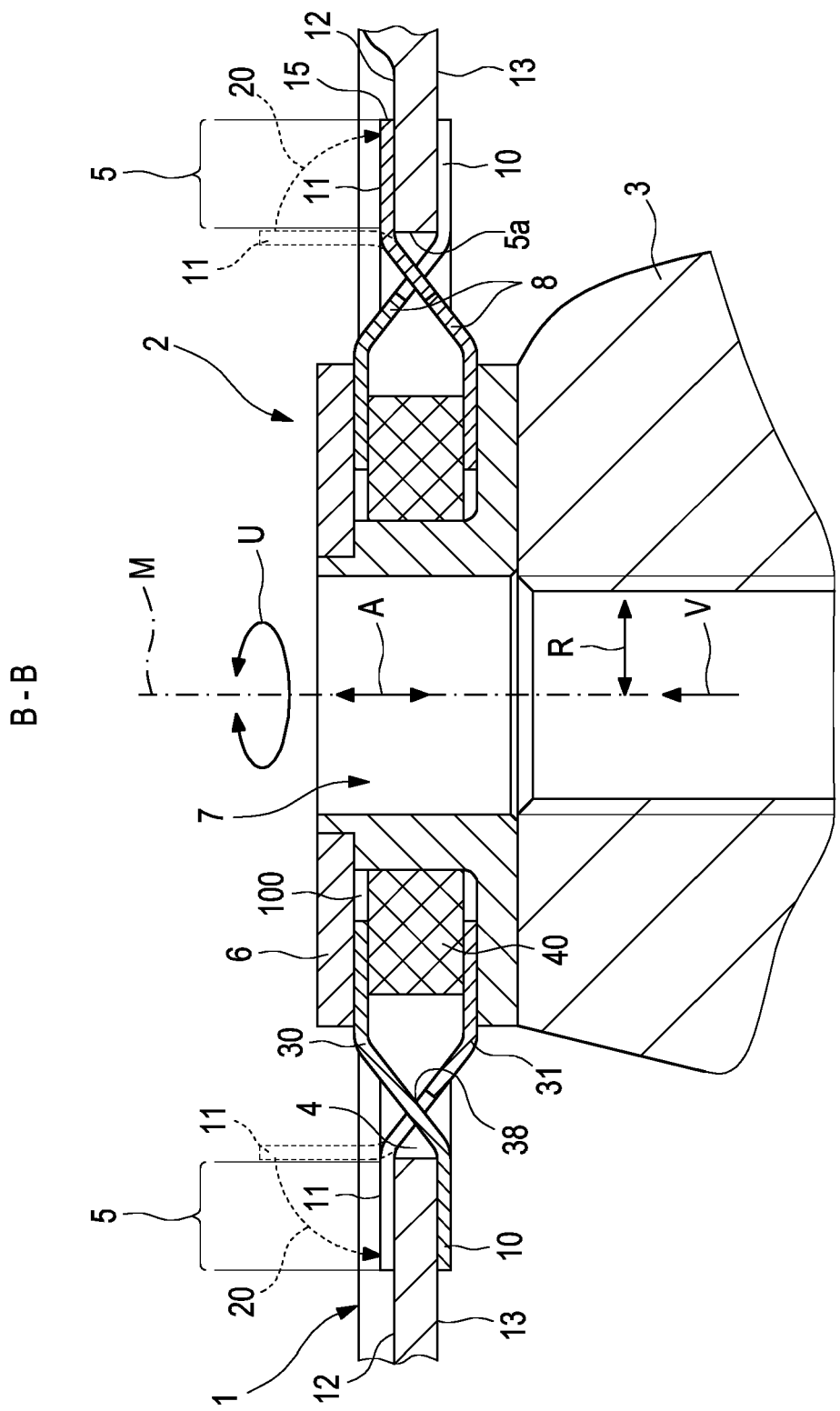
FIG. 8: schematically depicts a section along the line B-B from FIG. 7 through a shielding part with a decoupling device having the fastening device according to the invention shown in FIG. 7.

In the exemplary embodiment according to FIG. 4, the fastening device according to the invention is composed of a total of two individual parts 30, 31, which each have tabs 10, 11. Cross-sectionally, the individual parts 30, 31 are embodied essentially in the form of a disc spring radially inside the cut edges 35, 38. The individual parts 30, 31 in this case are placed against each other in the axial direction A so that they rest against each other in a radially outer region, i.e. in the vicinity of the cut edges 35, 38, and are spaced apart from each other in the axial direction A on the radial inside. The bushing 6 is provided so that it bridges across this axial spacing and prestresses the individual parts 30, 31 against each other in the axial direction A. The axial prestressing force is chosen—possibly by interposing a spacer element 40 (see FIG. 8)—so that the bushing 6 can move within the play in the radial direction R relative to the opening 100. This produces a sliding seat between the bushing 6 and the individual parts 30, 31. If need be, the bushing 6 is able to move in opposition to a particular friction force within the play relative to the decoupling device 2 composed of the first individual part 30 and the second individual part 31. This friction force can be preselected by differently selected prestressing forces of the bushing 6 with which the individual parts 30, 31 are prestressed against each other.

The individual parts 30, 31 of the bridge element 8 are advantageously composed of a stainless steel with favorable deformation properties, for example the material 1.4301.

In the fastening device according to the invention for fastening a decoupling device relative to a hole rim of a shielding part, it is particularly advantageous that the force fit, which is composed of the tabs that are positioned on one outside and the other outside of the shielding part in alternating fashion, is situated in a locally defined region of the bridge element. This locally defined region is advantageously the radially outermost region of the bridge element. Reaction forces, which are brought about by the production of the force fit, are absorbed with a very short flow of force inside the radially outer region of the bridge element in which the tabs are positioned. Regions of the bridge element positioned farther to the inside are not involved or not involved to any appreciable degree in the absorption of reaction forces that are required in order to produce the force fit. In the embodiment according to FIGS. 1 through 3, i.e. the one-layer embodiment of the bridge element 8, the reaction forces are absorbed in the radially outer region of the bridge element 8 in which the tabs are positioned. In the two-piece embodiment of the bridge element 8 according to FIGS. 4 through 8, the flow of force travels from a tab 30 radially inward a short distance and then continues via the cut edges 35, 38 that are supported on directly adjacent tabs of the other individual part, likewise over a very short distance. Regions of the bridge element 8, or more precisely of its individual parts 30, 31, that are situated radially further inward are not involved or only involved to an ancillary degree in the transmission of reaction forces that arise in the edge region. This yields freedom e.g. in the selection of the diameter of the opening 100, which enables wide latitudes of freedom in the structural design of a radial play of the bushing 6 relative to the bridge element 8.

The invention claimed is:

1. A fastening device for fastening a decoupling device relative to a hole rim of a hole opening of a shielding part to achieve a vibration-decoupling connection of a bushing to the shielding part, wherein at least a portion of the shielding part connected to the bushing is substantially coplanar with a central plane when the fastening device is in a fastened position, the fastening device comprising:

at least one bridge element having a multi-piece embodiment comprising at least one first individual part and one second individual part, wherein the at least one bridge element at its radially outer edge has fasteners for producing a fastening connection of the bridge element to the hole rim of the shielding part, wherein the fasteners comprise at least four tabs which, starting from the bridge element, protrude radially outward; and the first individual part of the bridge element forms a subset of at least two tabs that are configured to extend from a first side of the shielding part in the central plane and rest against an opposite second side of the shielding part in the central plane, in an installation position, and the second individual part of the bridge element forms a remainder of at least two tabs that are configured to extend from the opposite second side of the shielding part in the central plane and rest against the first side of the shielding part in the central plane, in the installation position, and the hole rim can be immobilized with a force fit relative to the decoupling device by the tabs of the subset and the tabs of the remainder, wherein in a preinstallation position of the decoupling device, the tabs of the subset or the tabs of the remainder are bent radially inward so that the decoupling device can be inserted into the hole opening in the shielding part in such a way that the other tabs extending radially outward can be brought into contact with an associated outside of the shielding part.

2. The fastening device according to claim 1, wherein, viewed in a circumference direction, adjacent tabs of the first individual part and, viewed in the circumference direction, adjacent tabs of the second individual part each form at least two spaces, with the tabs of the second individual part reaching radially and/or axially through the at least two spaces between tabs of the first individual part and with the tabs of the first individual part reaching radially and/or axially through the at least two spaces between the tabs of the second individual part.

3. The fastening device according to claim 1, wherein the tabs, which are bent radially inward in the preinstallation position of the decoupling device, can be brought into contact with the associated outside by bending the tabs radially outward, thus making it possible to produce the force fit.

4. The fastening device according to claim 1, wherein the tabs of the subset and the tabs of the remainder are arranged one after the other in alternating fashion viewed in a circumference direction.

5. The fastening device according to claim 1, wherein in an installed state, cut edges of a space bottom of spaces between each of the tabs of the one of the first and second individual parts are supported resting against the tabs of the other of the first and second individual parts.

6. The fastening device according to claim 1, wherein the bridge element or individual parts of the bridge element are stamped-and-bent parts or deep-drawn stamped parts composed of a metal sheet with a material thickness of 0.1 mm to 0.5 mm.

7. The fastening device according to claim 1, wherein the bridge element or individual parts of the bridge element are composed of stainless steel 1.4301.

8. A shielding part fastened to a decoupling device with the fastening device according to claim 1.

* * * * *